United States Patent
Topp et al.

(10) Patent No.: US 12,361,481 B2
(45) Date of Patent: Jul. 15, 2025

(54) TRANSACTION ANALYSIS FOR MULTIPLE ENTITIES

(71) Applicant: Truist Bank, Charlotte, NC (US)

(72) Inventors: Jonathan Topp, Montpelier, VA (US); Priya Kenkare Shankaranarayana, Sandy Springs, GA (US); Heather Choudhury, Stone Mountain, GA (US); Michael Geist, Woodstock, GA (US); Veeranjaneya Chandu, Alpharetta, GA (US)

(73) Assignee: Truist Bank, Charlotte, NC (US)

( * ) Notice: Subject to any disclaimer, the term of this patent is extended or adjusted under 35 U.S.C. 154(b) by 144 days.

(21) Appl. No.: 18/309,098

(22) Filed: Apr. 28, 2023

(65) Prior Publication Data

US 2024/0362704 A1  Oct. 31, 2024

(51) Int. Cl.
*G06Q 40/02* (2023.01)

(52) U.S. Cl.
CPC .................. *G06Q 40/02* (2013.01)

(58) Field of Classification Search
CPC ................................... G06Q 40/02
USPC ........................................... 705/35–45
See application file for complete search history.

(56) References Cited

U.S. PATENT DOCUMENTS

| | | | |
|---|---|---|---|
| 2010/0217701 A1* | 8/2010 | Mesilaty | G06Q 40/02 715/764 |
| 2015/0154570 A1* | 6/2015 | Dheer | G06Q 40/02 705/44 |
| 2024/0242269 A1* | 7/2024 | Creel | G06Q 40/02 |

* cited by examiner

*Primary Examiner* — Robert R Niquette
(74) *Attorney, Agent, or Firm* — Kilpatrick Townsend & Stockton LLP; Michael A. Springs, Esq.

(57) ABSTRACT

A computer-implemented method includes storing parameters that define data requested by a client device. The method also includes receiving the data that satisfies the parameters from interaction channels in response to a request for the data. The method further includes detecting unique identifiers in the data. Each unique identifier of the unique identifiers can be associated with an entity. Additionally, the method includes generating subsets of data for each of the unique identifiers. The method also includes causing a display of the subsets of data for each unique identifier at a user interface of the client device. The subsets of data for each unique identifier can be sent to the client device as separate files.

20 Claims, 6 Drawing Sheets

TRANSACTION ANALYSIS FOR MULTIPLE ENTITIES

TECHNICAL FIELD

The present disclosure relates generally to providing transaction information and, more particularly (although not necessarily exclusively), to facilitating transaction analysis for multiple entities.

BACKGROUND

Users may initiate transactions of resources using transaction systems. The transaction system may predict future transactions and amounts of resources available to the user for the transactions. The resources associated with the expected transactions can be obtained using various channels such as via online deposits channels, wire transfer channels, and other electronic resource transfer channels. Thus, the transaction system may provide insight into expected transactions for various channels.

SUMMARY

In one example, a system includes a processing device and a memory device that includes instructions that are executable by the processing device to cause the processing device to perform operations. The operations include storing, in a multi-channel adapter, at least one parameter defining data requested by a client device. The operations also include receiving, by the multi-channel adapter, the data that satisfies the at least one parameter from at least one interaction channel in response to a request for the data. The operations further include detecting, by the multi-channel adapter, a plurality of unique identifiers in the data, each unique identifier of the plurality of unique identifiers associated with an entity. Additionally, the operations include generating, by the multi-channel adapter, a subset of the data for each unique identifier of the plurality of unique identifiers. Further, the operations include causing, by the multi-channel adapter, a display of the subset of data for each unique identifier at a user interface of the client device, the subset of the data for each unique identifier being sent to the client device as a separate file, the subset of data for each unique identifier being usable by the client device to analyze account activity.

In another example, a computer-implemented method includes storing, in a multi-channel adapter, at least one parameter defining data requested by a client device. The method also includes receiving, by the multi-channel adapter, the data that satisfies the at least one parameter from at least one interaction channel in response to a request for the data. The method further includes detecting, by the multi-channel adapter, a plurality of unique identifiers in the data, each unique identifier of the plurality of unique identifiers associated with an entity. Additionally, the method includes generating, by the multi-channel adapter, a subset of the data for each unique identifier of the plurality of unique identifiers. Further, the method includes causing, by the multi-channel adapter, a display of the subset of data for each unique identifier at a user interface of the client device, the subset of the data for each unique identifier being sent to the client device as a separate file, the subset of data for each unique identifier being usable by the client device to analyze account activity.

In another example, a non-transitory computer-readable medium includes instructions that are executable by a processing device for performing operations. The operations include storing, in a multi-channel adapter, at least one parameter defining data requested by a client device. The operations also include receiving, by the multi-channel adapter, the data that satisfies the at least one parameter from at least one interaction channel in response to a request for the data. The operations further include detecting, by the multi-channel adapter, a plurality of unique identifiers in the data, each unique identifier of the plurality of unique identifiers associated with an entity. Additionally, the operations include generating, by the multi-channel adapter, a subset of the data for each unique identifier of the plurality of unique identifiers. Further, the operations include causing, by the multi-channel adapter, a display of the subset of data for each unique identifier at a user interface of the client device, the subset of the data for each unique identifier being sent to the client device as a separate file, the subset of data for each unique identifier being usable by the client device to analyze account activity.

DETAILED DESCRIPTION

Certain aspects and examples of the present disclosure relate to a system and method for facilitating transaction analysis for multiple entities. The system can generate a real-time connection with various interaction channels and selectively retrieve data from the interaction channels. The system may selectively retrieve the data based on parameters that can be tailored to provide seamless communication with the interaction channels and further tailored based on client preferences. By way of one example, the system can automatically detect that the data retrieved from the interaction channels is associated with multiple entities. The system may further detect a unique identifier of each entity in the data and automatically generate a file for each entity that contains the data associated with each entity to enable transmission of the data for multiple entities to a client device. Certain examples provide a multi-channel adapter that can increase processing speed of data from the interaction channels by selectively retrieving the data and by enabling the processing of data from multiple entities.

In some examples, the interaction channels can be transaction channels containing transaction data. Examples of transaction channels may include Automated Clearing House (ACH), Online Deposit, Wire Transfer, Lockbox, Remote Deposit Capture, etc. Additionally, the multi-channel adapter can store parameters associated with the transaction channels. For example, the multi-channel adapter can store a threshold for each transaction channel, which can be a number of accounts the multi-channel adapter is capable of retrieving data for in a request. The multi-channel adapter can further store parameters according to user preferences. For example, the user preferences can indicate a type of transaction data desired from each of the transaction channels. The type of transaction data can be unique for each transaction channel and each transaction channel can include various types of transaction data. For example, a first type of transaction data can for wire transfers can be domestic wire transfers and a second type of transaction data for wire transfers can be international wire transfers. Additionally, for ACH a third type of transaction data can be for credit transactions and a fourth type of transaction data can be for debit transactions. Thus, the multi-channel adapter can transmit requests for data based on the parameters to facilitate selective and efficient transmission of the data to the client device. The multi-channel adapter can further facilitate analysis of the data at the client device by retrieving the data according to the user preferences.

Additionally, the multi-channel adapter can detect unique identifiers in the data. In some examples, the unique identifiers can be routing transit (RT) numbers or American Bankers Association (ABA) numbers that can be used to identify a bank or other suitable financial institution. The client device may be unable to identify or otherwise ingest data with more than one unique identifier in a single file. So, in response to a request for data, the multi-channel adapter can retrieve transaction data for a first transaction and a second transaction. The first transaction can be initiated via electronic fund transfer and the first transaction data retrieved can include a first account number and a first RT number. The second transaction may also be initiated via electronic fund transfer and second transaction data retrieved can include a second account number and a second RT number. The multi-channel adapter can detect that the first RT number and the second RT number are different and can automatically generate a first file containing the first transaction data and a second file containing the second transaction data.

Once divided, the files can be transmitted successfully to the client device and the files can be used by the client device to analyze account activity. For example, the client device can analyze account activity by viewing values for the first and second transactions as included in the first and second files. Additionally, in some examples, the multi-channel adapter may analyze account activity using the transaction data. For example, the multi-channel adapter may determine which of the interaction channels produce the most data, which types of data are most useful for the client, detect changes in transaction volume or processing time for the data, or perform other suitable analysis of the transaction data.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
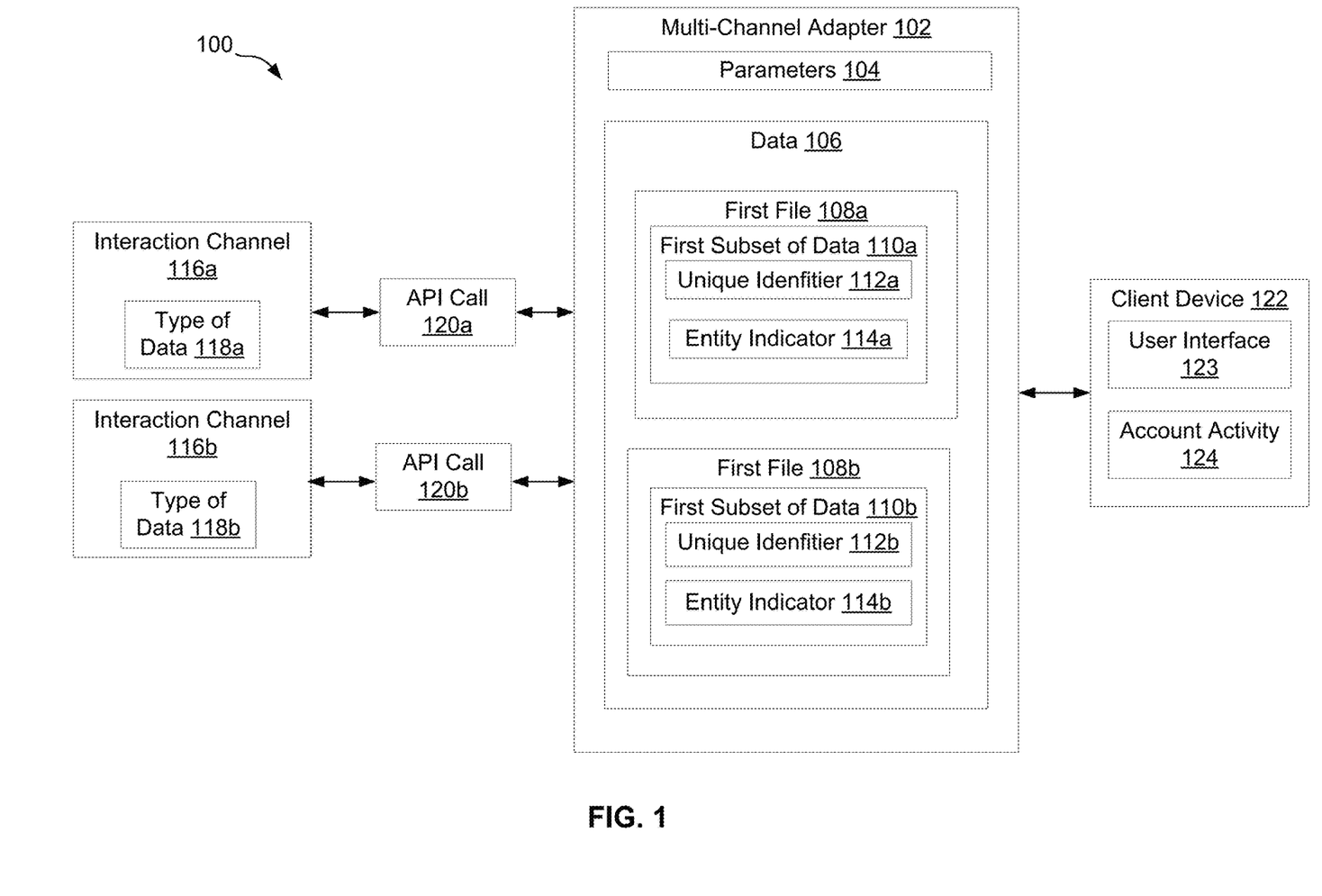
FIG. 1 is a block diagram of an example of a system for facilitating transaction analysis for multiple entities according to one example of the present disclosure.

FIG. 1 is a block diagram of an example of a system 100 for facilitating transaction analysis for multiple entities according to one example of the present disclosure. The system 100 can include a multi-channel adapter 102 that can be communicatively coupled with a client device 122 and interaction channels 116a-b. In some examples, the interaction channels 116a-b can be transaction channels (e.g., payment systems or payment applications) that can be used to carry out transactions. Examples can include Automated Clearing House (ACH), Lockbox, Online Bill Consolidator, Remote Deposit, etc.

The system 100 may store, by the multi-channel adapter 102, parameters 104, which can define data 106 requested by the client device 122. In some examples, the data 106 can be transaction data extracted from the transaction channels. Examples of transaction data may include an amount of resources associated with a transaction, a time stamp for which the transaction was initiated, or other suitable transaction data. To specify the data 106 that can be useful for analysis of account activity 124, the client device 122 can receive the parameters 104 from a client via the user interface 123 of the client device 122. The client can be a financial institution, an employee of the financial institution, or another suitable entity or user.

The parameters 104 can include parameters unique to each of the interaction channels 116a-b. The parameters unique to each of the interaction channels 116a-b can be associated with types of data 118a-b found in the interaction channels 116a-b. For example, a first interaction channel 116a can be associated with wire transfers. The parameters 104 for the first interaction channel 116a can include wire type codes, transaction type codes, or other suitable parameters for the wire transfers. Additionally, a second interaction channel 116b can be ACH, which can be a computer-based electronic network for processing transactions. The parameters 104 for the second interaction channel 116b can include standard entry class codes, service class codes, transaction codes, or other suitable parameters for transactions initiated via ACH.

The parameters 104 can be set based on user preferences. For example, the transaction type codes for the first interaction channel 116a can be types of wire transactions such as domestic wire transfers, international wire transfers, or other suitable wire transfers. Thus, the client device 122 can receive, via the user interface 123, which transaction type codes can be retrieved by the multi-channel adapter 102 from the first interaction channel 116a. By storing the parameters 104 received by the client device 122, the multi-channel adapter 102 can continuously and selectively retrieve the data 106 from the interaction channels 116a-b in response to requests from the client device 122 with low latency. Additionally, the interaction channels 116a-b can retrieve the data 106 from the interaction channels 116a-b in real-time, such as within five minutes of the data 106 becoming available in the interaction channels 116a-b.

Additionally or alternatively, the parameters 104 can include sets of accounts for which the client device 122 can request the data 106. For example, the client device 122 can be associated with a first set of accounts that can receive transactions via wire transfers and a second set of accounts that can receive transactions via ACH. In some examples, at least a portion of the first set of accounts and the second set of accounts can be the same. The sets of accounts can also be provided via the user interface 123. The multi-channel adapter 102 can store the sets of accounts as part of the parameters 104 to continuously retrieve the data 106 associated with the sets of accounts.

In some examples, the multi-channel adapter 102 can execute application programming interface (API) calls 120*a-b* to the interaction channels 116*a-b* to cause retrieval of the data 106 by the multi-channel adapter 102. The API calls 120*a-b* can be unique for each interaction channel 116*a-b*. For example, a first API call 120*a* for the first interaction channel 116*a* can request a first type of data 118*a* for wire transfers, while a second API call 120*b* for a second interaction channel 116*b* can request a second type of data 118*b* for ACH. The API calls 120*a-b* can further be unique based on the parameters 104. For example, execution of the first API call 120*a* can cause the multi-channel adapter 102 to receive first data that satisfies the wire type codes, the transaction type codes, and the first set of accounts.

The multi-channel adapter 102 can further detect unique identifiers 112*a-b* in the in the data 106. The unique identifiers 112*a-b* can be associated with entities. In some examples, the unique identifiers 112*a-b* can be routing transit (RT) numbers or American Bank Association (ABA) numbers and the entities can be banks or other suitable financial institutions. The multi-channel adapter 102 can include entity indicators 114*a-b* to associate the unique identifiers 112*a-b* to respective entities.

In an example, the multi-channel adapter 102 can execute, in response to the request from the client device 122, the first API call 120*a* to the first interaction channel 116*a* and the second API call 120*b* to the second interaction channel 116*b*. The API calls 120*a-b* can cause retrieval of the data 106 that satisfies the parameters 104 stored in the multi-channel adapter 102. The data 106 can be indicative of expected funds sent by a customer or other suitable entity to accounts associated with the client device 122. The multi-channel adapter 102 can detect that the data 106 includes unique identifiers 112*a-b*. In some examples, the data 106 with more than one unique identifier cannot be transmitted to the client device 122 or the client device 122 may not be able to differentiate between data with a first unique identifier 112*a* and data with a second unique identifier 112*b* if the data is received by the client device 122 in a single file. For example, the data 106 can include multiple RT numbers, but the client device 122 may not be able to receive data with multiple RT numbers.

Therefore, in response to detecting the unique identifiers 112*a-b*, the multi-channel adapter 102 can generate subsets of data 110*a-b* for each of the unique identifiers 112*a-b*. A first subset of data 110*a* can include data associated with the first unique identifier 112*a* and a second subset of data 110*b* can include data associated with the second unique identifier 112*b*. The multi-channel adapter 102 can further generate files 108*a-b* for the subsets of data 110*a-b*. A first file 108*a* can contain the first subset of data 110*a* and a second file 108*b* can contain the second subset of data 110*b*. The files 108*a-b* can include the entity indicators 114*a-b* associated with the unique identifiers 112*a-b*. The files 108*a-b* can further include an indication of being retrieved in response to the same request from the client device 122.

The multi-channel adapter 102 can transmit the files 108*a-b* to the client device 122 to cause display of the subsets of data 110*a-b* at a user interface 123 of the client device 122. The user interface 123 may include graphs, tables, or other suitable methods of organizing and displaying the subsets of data 110*b*. In some examples, the subsets of data 110*a-b* may be displayed, analyzed, or the like separately, or the subsets of data 110*a-b* can be recombined at the client device 122 to be displayed, analyzed, etc. together. Additionally, the subsets of data 110*a-b* can be used by the client device 122 to analyze account activity 124. For example, the subsets of data 110*a-b* can be indicative of funds expected to be received by a client account within a certain timeframe, such as one business day. Thus, the client device 122 can generate a prediction of upcoming account activity based on the subsets of data 110*a-b*.

Figure 2:
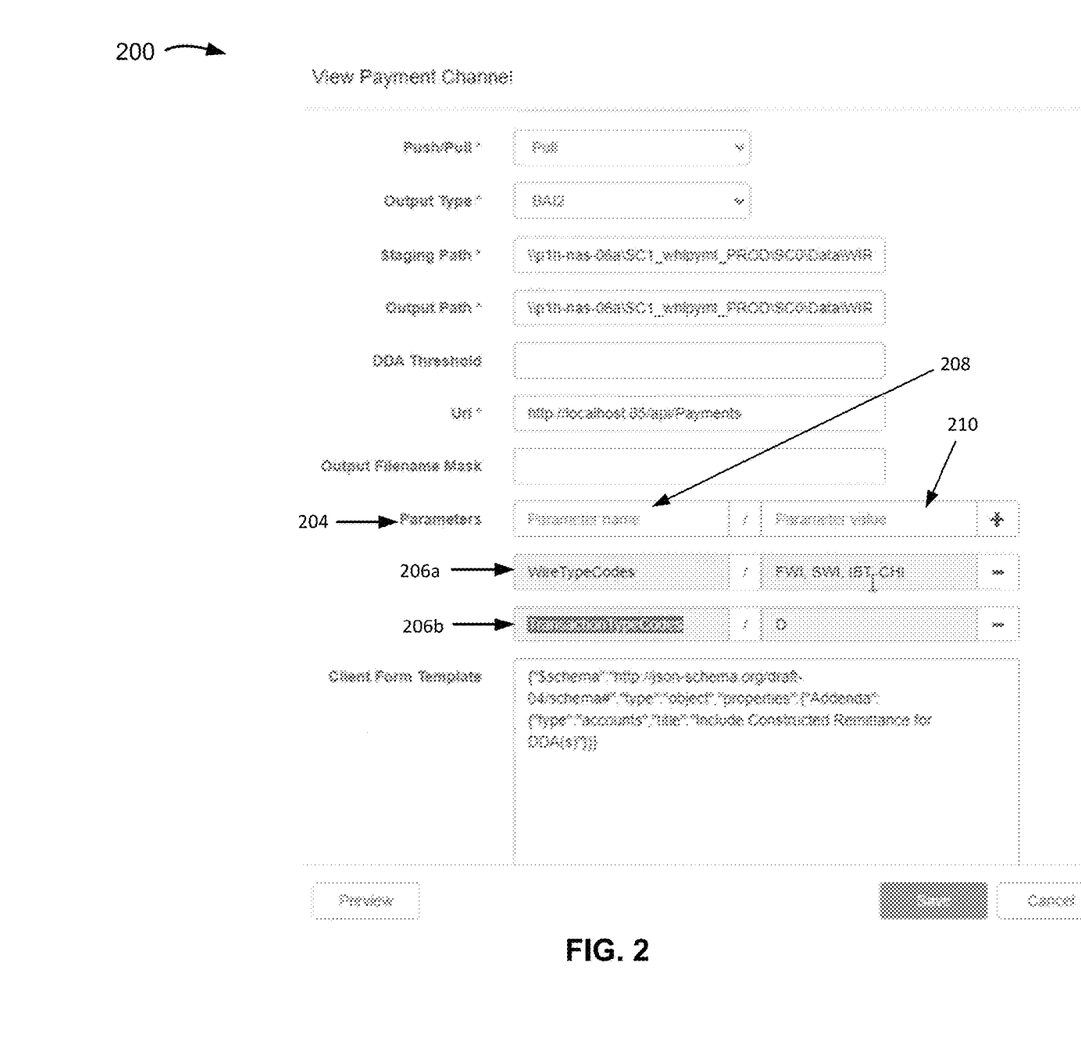
FIG. 2 is an example of a user interface for providing parameters to facilitate transaction analysis for multiple entities according to one example of the present disclosure.

FIG. 2 is an example of a user interface 200 for providing parameters 204 to facilitate transaction analysis for multiple entities according to one example of the present disclosure. Aspects of FIG. 2 are discussed in reference to the components shown in FIG. 1. The user interface 200 can be a display on a client device 122 such as a laptop, tablet, or other suitable client device. In some examples, the client device 122 can receive the parameters 204 for each of the interaction channels 116*a-b* from a client via the user interface 200. The client device 122 can receive a parameter name 208 and a parameter value 210 to define data that can be retrieved by a multi-channel adapter 102 from interaction channels 116*a-b*. The client device 122 can further transmit the parameter name 208 and the parameter value 210 in a request to the multi-channel adapter 102.

For example, the user interface 200 can be used to set the parameters 204 for the first interaction channel 116*a*. Therefore, a first parameter 206*a* can be wire type codes to specify types of wire transfers for which the client device 122 can request data. Additionally, a second parameter 206*b* can be transaction type codes to specify transaction types for which the client device 122 can request data. As a result of the client device 122 receiving the parameters 204, the multi-channel adapter 102 can store the parameters 204 and can retrieve data 106 from the first interaction channel 116*a* that satisfies the parameters 204. Additionally, the client device 122 can receive an adjustment the parameters 204 via the user interface 200, which can cause the multi-channel adapter 102 to update the stored parameters and can further cause the multi-channel adapter 102 to adjust a first API call 120*a*. The first API call 120*a* can be a request transmitted by the multi-channel adapter 102 to the first interaction channel 116*a* for the data 106.

Figure 3:
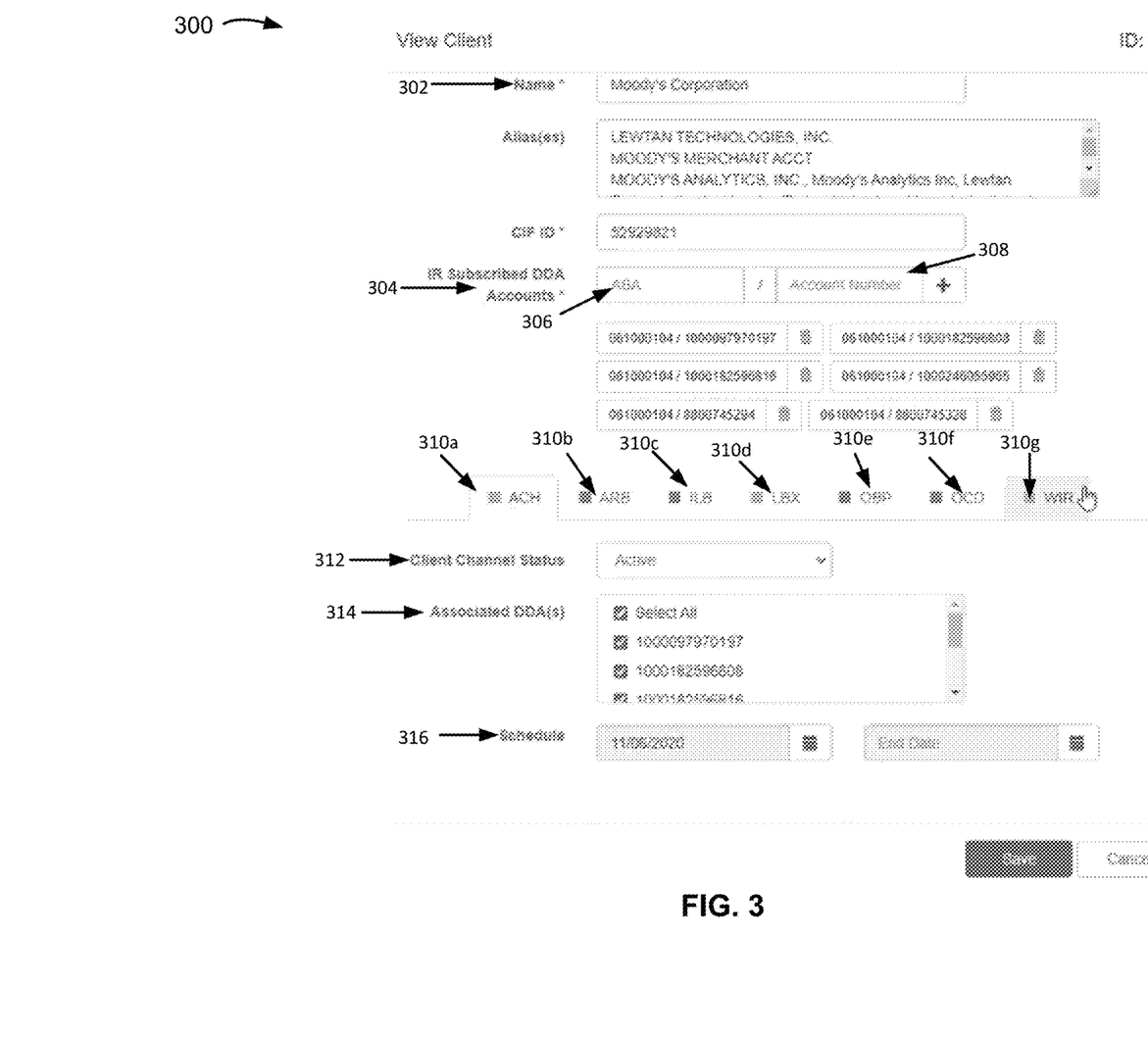
FIG. 3 is an example of a user interface for providing client preferences to facilitate transaction analysis for multiple entities according to one example of the present disclosure.

FIG. 3 is an example of a user interface 300 for providing client preferences to facilitate transaction analysis for multiple entities according to one example of the present disclosure. The user interface 300 can be a first page that can be navigated to from a second page, such as the page shown in user interface 200 depicted in FIG. 2. For example, a client may be able to toggle between the pages on a client device 122. Additionally, the pages can enable the client to customize data 106 transmitted to the client device 122 by the multi-channel adapter 102.

The user interface 300 can include a client identifier 302 and account identifiers 304 of accounts that are associated with the client. For each of the accounts, the user interface 300 can include a first identification portion 306 and a second identification portion 308. The first identification portion 306 can be for a RT number or ABA number. The RT numbers or ABA numbers can be unique identifiers detected by the multi-channel adapter 102 in data 106 from the interaction channels 310*a-g*. The second identification portion 308 can be an account number. In some examples, a particular RT or ABA number can be associated with multiple unique account numbers. The multi-channel adapter 102 can store the account identifiers 304 and can retrieve the data 106 from the interaction channels 310*a-g* for the accounts associated with the account identifiers 304. For example, a customer or other suitable user can initiate a transaction to one of the accounts via ACH. The multi-channel adapter 102 can automatically retrieve the data 106 for the transaction from a first interaction channel 310*a* based on the account identifiers 304 provided via the user interface 300.

The user interface 300 can further include an associated accounts option 314 for each of the interaction channels 310*a-g* to enable subsets of the account identifiers 304 to be selected for each of the interaction channels 310*a-g*. The multi-channel adapter 102 can retrieve data for the subsets of the accounts based on selections in the associated accounts option 314.

Additionally or alternatively, the user interface 300 can have a client channel status option 312 that can be used to activate or deactivate retrieval of the data 106 from the interaction channels 310*a-g*. The user interface 300 can further have a schedule option 316 to enable the client device 122 to request data for certain days or timeframes.

Figure 4:
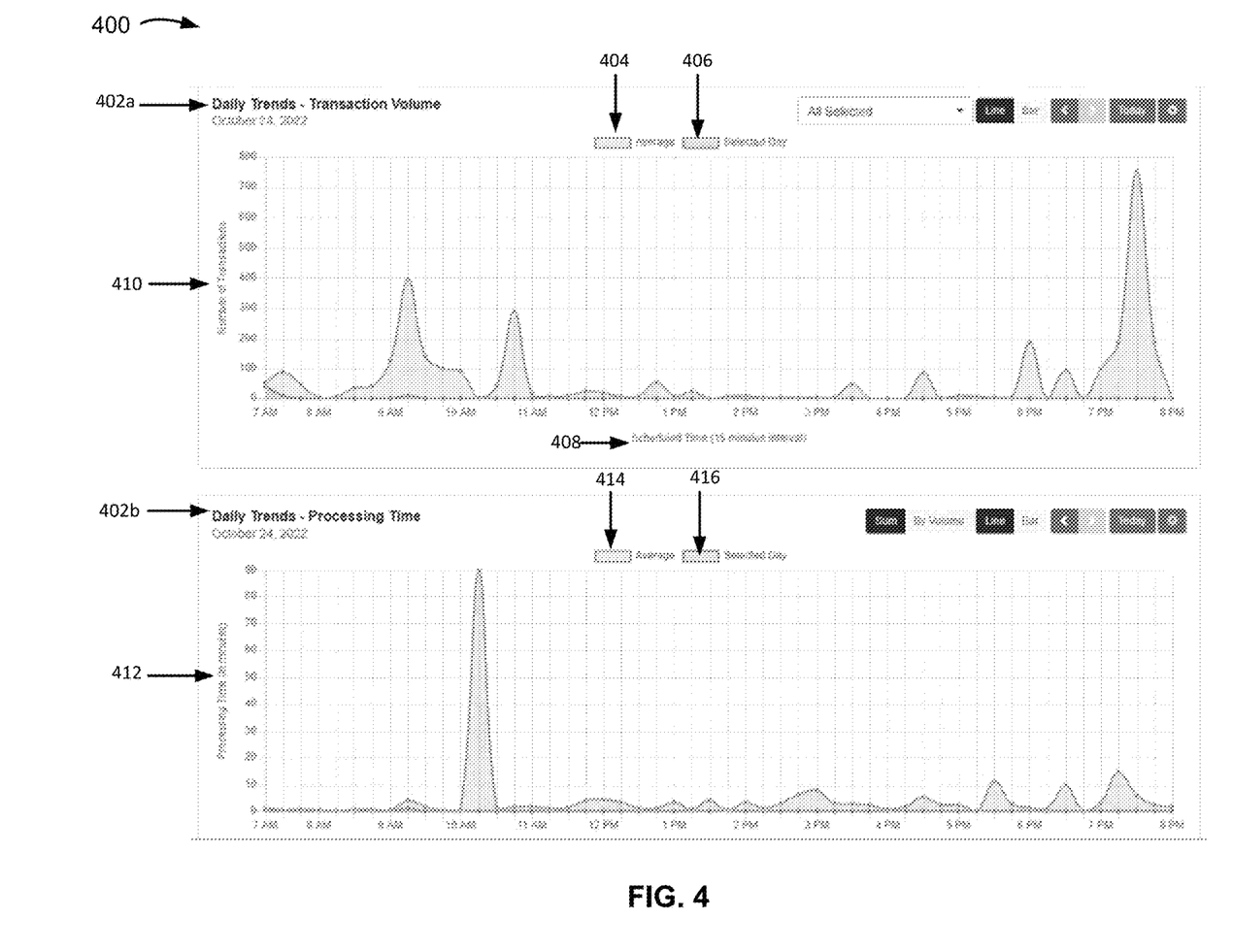
FIG. 4 is an example of a user interface for facilitating transaction analysis for multiple entities according to one example of the present disclosure.

FIG. 4 is an example of a user interface 400 for facilitating transaction analysis for multiple entities according to one example of the present disclosure. Aspects of FIG. 4 are discussed in reference to the components shown in FIG. 1. The user interface 400 can be an example of a display of data caused by a multi-channel adapter 102 transmitting data 106 to a client device 122. The user interface 400 may include graphs 402*a-b*, tables, or other suitable displays of data organization to enable analysis of the data 106. The user interface 400 can also be associated with the user interfaces of FIGS. 2 and 3 such that the client device 122 can receive parameters, sets of accounts, etc. via 122 and can further provide the data 106 received from a multi-channel adapter 102 via the user interfaces.

The user interface 400 can include a first graph 402*a* for analyzing transaction volume. The first graph 402*a* can show the number of transactions 410 over scheduled times 408. For example, the first graph 402*a* depicts the number of transactions 410 occurring every fifteen minutes. The first graph 402*a* can further include average transaction volumes 404 for comparison to selected day transaction volumes 406. In some examples, a difference between the average transaction volumes 404 and selected day transaction volumes 406 can exceed a transaction volume threshold. The transaction volume threshold may be provided by the client device 122 and can be based on historical data for transaction volume. In response to the difference exceeding the transaction volume threshold, the user interface 400 can generate a first alert for display on the client device 122 or another computing device.

Additionally, the user interface 400 can include a second graph 402*b* for analyzing processing times 412. The processing times 412 can be time required for the multi-channel adapter to receive data from the interaction channels. The second graph 402*b* can show the processing times 412 over scheduled times and as compared to historical averages for the scheduled times. The processing times 412 can be in minutes, seconds, or hours. The second graph 402*b* can further include average processing times 414 for comparison to selected day processing times 416. In some examples, a difference between the average processing times 414 and selected day processing times 416 can exceed a processing time threshold. The processing time threshold can be set by the client device 122 and may be based on historical data indicative of processing times. For example, the average processing time associated with the multi-channel adapter retrieving data for a transaction can be ten seconds. Therefore, the processing time threshold can be, as an example, twenty minutes. In response to the difference exceeding the processing time threshold, the client device 122 can generate a second alert for display on the client device 122 or another computing device.

Figure 5:
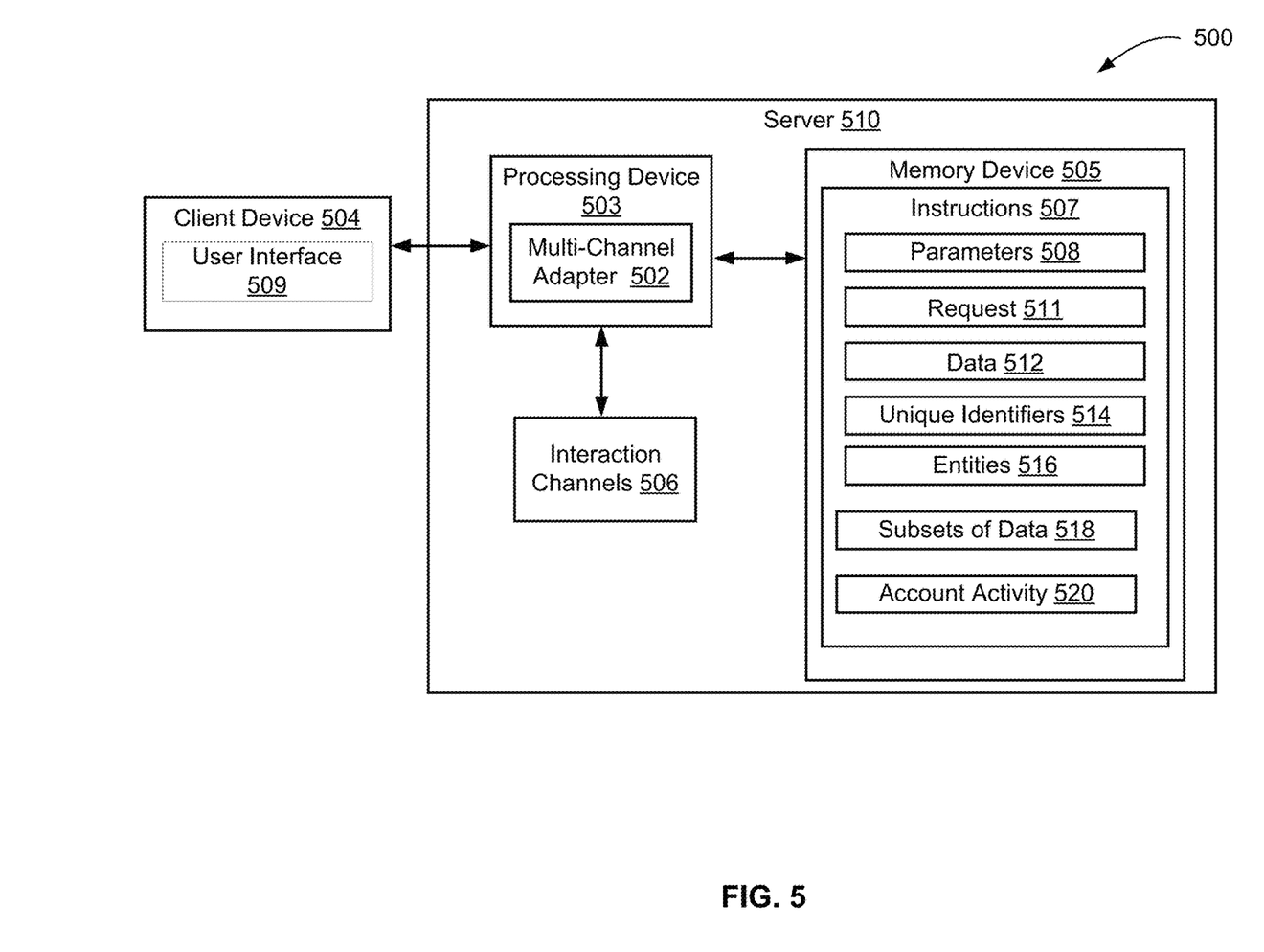
FIG. 5 is a block diagram of an example of a computing system for facilitating transaction analysis for multiple entities according to one example of the present disclosure.

FIG. 5 is a block diagram of an example of a computing system 500 for facilitating transaction analysis for multiple entities according to one example of the present disclosure. The system 500 includes a processing device 503 that is communicatively coupled to a memory device 505. In some examples, the processing device 503 and the memory device 505 can be part of the same computing device, such as the server 510. In other examples, the processing device 503 and the memory device 505 can be distributed from (e.g., remote to) one another.

The processing device 503 can include one processor or multiple processors. Non-limiting examples of the processing device 503 include a Field-Programmable Gate Array (FPGA), an application-specific integrated circuit (ASIC), or a microprocessor. The processing device 503 can execute instructions 507 stored in the memory device 505 to perform operations. The instructions 507 may include processor-specific instructions generated by a compiler or an interpreter from code written in any suitable computer-programming language, such as C, C++, C#, Java, or Python.

The memory device 505 can include one memory or multiple memories. The memory device 505 can be volatile or non-volatile. Non-volatile memory includes any type of memory that retains stored information when powered off. Examples of the memory device 505 include electrically erasable and programmable read-only memory (EEPROM) or flash memory. At least some of the memory device 505 can include a non-transitory computer-readable medium from which the processing device 503 can read instructions 507. A non-transitory computer-readable medium can include electronic, optical, magnetic, or other storage devices capable of providing the processing device 503 with computer-readable instructions or other program code. Examples of a non-transitory computer-readable medium can include a magnetic disk, a memory chip, ROM, random-access memory (RAM), an ASIC, a configured processor, and optical storage.

The processing device 503 can execute the instructions 207 to perform operations. For example, the processing device 503 can store, by a multi-channel adapter 502, parameters 508 defining data 512 requested by a client device 504. The processing device 503 can also receive, by the multi-channel adapter 502, the data 512 that satisfies the parameters 508 from interaction channels 506 in response to a request 511 for the data 512. The processing device 503 can further detect, via the multi-channel adapter 502, unique identifiers 514 in the data 512. The unique identifiers 514 can be associated with entities 516. Additionally, the processing device 503 can generate, via the multi-channel adapter 502, subsets of the data 518 for each the unique identifiers 514. The processing device 503 can cause, via the multi-channel adapter 502, a display of the subsets of data 518 for the unique identifiers 514 at a user interface 509 of the client device 504. The subsets of data 518 can be sent to the client device 504 as separate files and the subsets of data 518 can be used by the client device 504 to analyze account activity 520.

Figure 6:
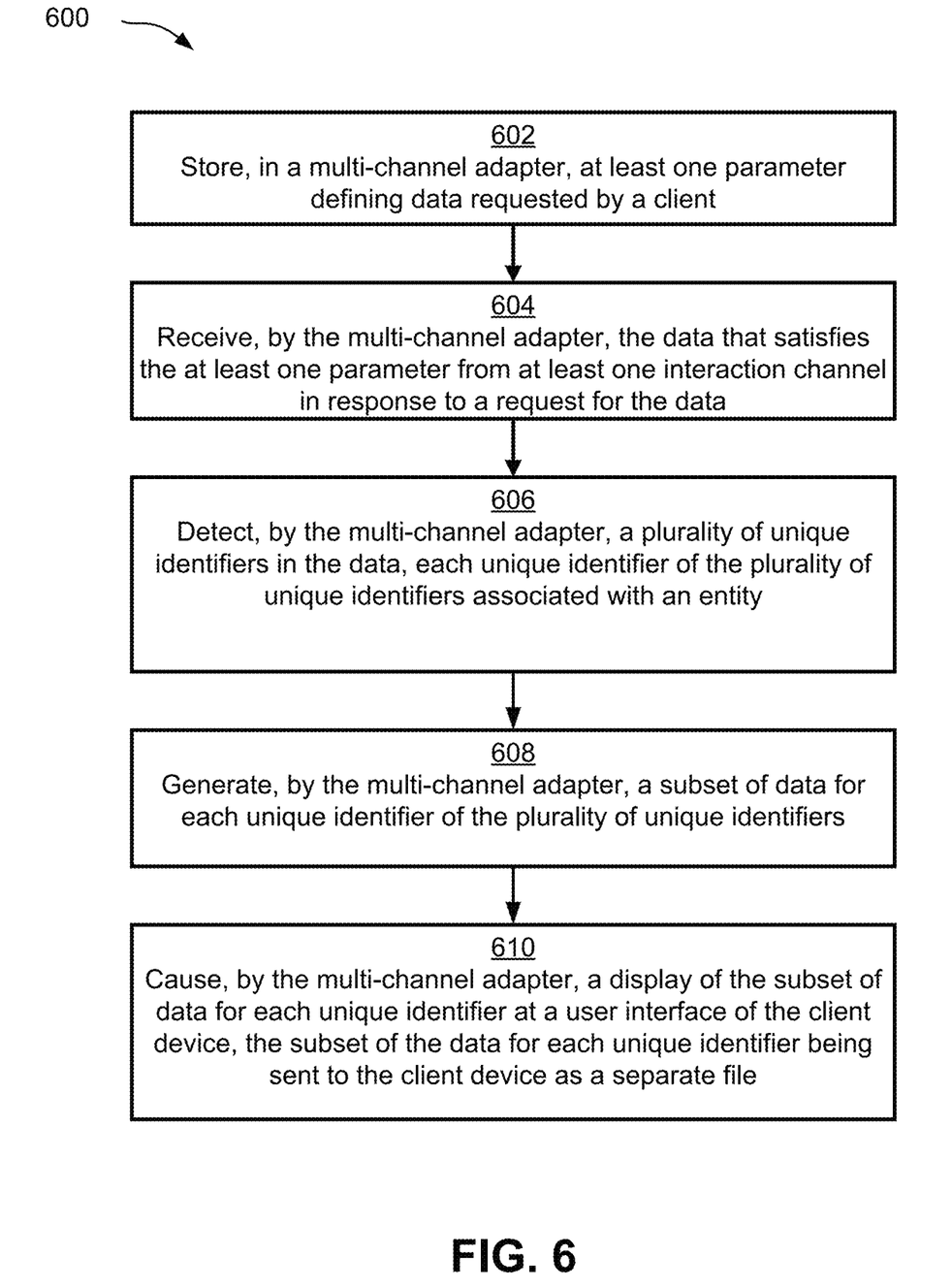
FIG. 6 is a flowchart of process for facilitating transaction analysis for multiple entities according to one example of the present disclosure.

FIG. 6 is a flowchart of process for facilitating transaction analysis for multiple entities according to one example of the present disclosure. In some examples, the processing device 503 can implement some or all of the steps shown in FIG. 6. Other examples can include more steps, fewer steps, different steps, or a different order of the steps than is shown in FIG. 6. The steps of FIG. 6 are discussed below with reference to the components discussed above in relation to FIGS. 1 and 5.

At block 602, the processing device 503 can store, by a multi-channel adapter 102, at least one parameter defining data 106 requested by a client device 122. The data 106 requested by the client device 122 can be transaction data. Additionally, the parameters 104 stored by the multi-channel adapter 102 can be received by the client device 122 from a client via a user interface 123 of the client device 122. The parameters 104 can specify types of data 118*a-b*, account numbers, etc. to define the data 106 requested by the client device 122.

At block 604, the processing device 503 can receive, by the multi-channel adapter 102, the data 106 that satisfies the at least one parameter from at least one interaction channel in response to a request for the data 106. In some examples, the parameters 104 can include parameters that are unique to interaction channels 116*a-b*. For example, a first parameter can specify a first type of data 118*a* to be received by the multi-channel adapter 102 from a first interaction channel 116*a* and a second parameter can specify a second type of data 118*b* to be received by the multi-channel adapter 102 from a second interaction channel 116*b*.

Additionally, the client device 122 can transmit the request for the data 106 to the multi-channel adapter 102. In response, the multi-channel adapter 102 may execute API calls 120*a-b* to the interaction channels 116*a-b* to cause retrieval of the data 106 by the multi-channel adapter 102. In an example, a first API call 120*a* associated with the first interaction channel 116*a* can be different from a second API call 120*b* associated with the second interaction channel 116*b*. The client device 122 can also transmit an adjustment to the parameters 104 to the multi-channel adapter 102. For example, the multi-channel adapter 102 can receive an adjustment to the first type of data 118*a*. In response, the multi-channel adapter 102 can adjust the first API call 120*a* to cause the multi-channel adapter 102 to receive the adjusted first type of data from the first interaction channel 116*a*.

At block 606, the processing device 503 can detect, by the multi-channel adapter 102, unique identifiers 112*a-b* in the data 106, each unique identifier of the unique identifiers 112*a-b* can be associated with a different entity. The unique identifiers 112*a-b* can be RT number or ABA numbers and the entities can be banks or other suitable financial institutions. For example, the data 106 received by the multi-channel adapter 102 can be indicative of expected transactions. The expected transactions can be expected to be received by a first set of accounts at a first bank and a second set of accounts at a second bank. Therefore, the data 105 can have a first unique identifier 112*a* for the first bank and a second unique identifier 112*b* for the second bank.

At block 608, the processing device 503 can generate, by the multi-channel adapter 102, a subset of data for each unique identifier of the unique identifiers 112*a-b*. For example, the multi-channel adapter 102 can generate a first set of data 110*a* for the first unique identifier 112*a* and a second set of data 110*b* for the second unique identifier 112*b*. The multi-channel adapter can also generate a first file 108*a* with the first subset of data 110*a* and a second file 108*b* with the second subset of data 110*b*. The multi-channel adapter 102 can generate the files 108*a-b* and the subsets of data 110*a-b* to enable the client device 122 to receive the data 106 that includes multiple unique identifiers 112*a-b*.

At block 610, the processing device 503 can cause, by the multi-channel adapter 102, a display of the subset of data for each unique identifier at the user interface 123 of the client device 122. The subset of the data for each unique identifier can be sent to the client device 122 as a separate file. The subset of data for each unique identifier may be usable by the client device 122 to analyze account activity. The subsets of data 110*a-b* can be displayed together or separately at the user interface 123. Additionally, the subsets of data 110*a-b* can be displayed as graphs, tables, or the like to enable analysis of account activity 124. The subsets of data 110*a-b* may be compared to historical data or otherwise analyzed. In some examples, the client device 122 can generate a prediction of upcoming account activity based on the subsets of data 110*a-b*.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device that includes instructions executable by the processing device for causing the processing device to perform operations comprising:
 storing, by a multi-channel adapter, at least one parameter defining data requested by a client device;
 receiving, by the multi-channel adapter, the data that satisfies the at least one parameter from at least one interaction channel in response to a request for the data;
 receiving, by the multi-channel adapter, a processing time that is a length of time for the multi-channel adapter to receive the data from the at least one interaction channel;
 determining, by the multi-channel adapter, that the processing time exceeds a processing time threshold;
 in response to determining that the processing time exceeds the processing time threshold, adjusting, by the multi-channel adapter, the at least one parameter to reduce a subsequent processing time for the multi-channel adapter to receive second data from the at least one interaction channel and reduce latency in the multi-channel adapter receiving data as compared to a latency without adjusting the at least one parameter;
 subsequent to adjusting the at least one parameter:
  receiving, by the multi-channel adapter, the second data that satisfies the adjusted at least one parameter;
  detecting, by the multi-channel adapter, a plurality of unique identifiers in the second data, each unique identifier of the plurality of unique identifiers associated with an entity;
  generating, by the multi-channel adapter, a subset of the second data for each unique identifier of the plurality of unique identifiers; and
  causing, by the multi-channel adapter, a display of the subset of the second data for each unique identifier at a user interface of the client device, the subset of the second data for each unique identifier being sent to the client device as a separate file.

2. The system of claim 1, wherein the memory device further includes instructions executable by the processing device for causing the processing device to perform operations comprising:
executing, by the multi-channel adapter, at least one application programming interface call to the at least one interaction channel to cause retrieval of the data by the multi-channel adapter.

3. The system of claim 2, wherein a first application programming interface call of the at least one application programming interface call associated with a first interaction channel of the at least one interaction channel is different than a second application programming interface call of the at least one application programming interface call associated with a second interaction channel of the at least one interaction channel.

4. The system of claim 2, wherein the memory device further includes instructions executable by the processing device for causing the processing device to, prior to adjusting the at least one parameter:
receive, by the multi-channel adapter, an adjustment to the at least one parameter.

5. The system of claim 1, wherein the plurality of unique identifiers comprises a first unique identifier associated with a first entity and a second unique identifier associated with a second entity, and wherein the memory device further includes instructions executable by the processing device for causing the processing device to perform operations comprising:
executing, by the multi-channel adapter, a plurality of application programming interface calls to a set of interaction channels based on the adjusted at least one parameter;
receiving, by the multi-channel adapter, third data from the set of interaction channels, the third data associated with the first entity and the second entity;
detecting, by the multi-channel adapter, the first unique identifier for the first entity and the second unique identifier for the second entity in the third data;
generating, by the multi-channel adapter, a first file with a first subset of the third data associated with the first unique identifier and a second file with a second subset of the third data associated with the second unique identifier; and
transmitting, by the multi-channel adapter, the first file and the second file with an indication of the first file and the second file being received together.

6. The system of claim 1, wherein the at least one parameter comprises a parameter that is unique to each interaction channel of the at least one interaction channel and based on at least one type of data in each interaction channel of the at least one interaction channel.

7. The system of claim 6, wherein the at least one parameter is adjustable via the client device.

8. The system of claim 1, wherein the client device is configured to generate a prediction of upcoming account activity.

9. A computer-implemented method comprising:
storing, by a multi-channel adapter, at least one parameter defining data requested by a client device;
receiving, by the multi-channel adapter, the data that satisfies the at least one parameter from at least one interaction channel in response to a request for the data;
receiving, by the multi-channel adapter, a processing time that is a length of time for the multi-channel adapter to receive the data from the at least one interaction channel;
determining, by the multi-channel adapter, that the processing time exceeds a processing time threshold;
in response to determining that the processing time exceeds the processing time threshold, adjusting, by the multi-channel adapter, the at least one parameter to reduce a subsequent processing time for the multi-channel adapter to receive second data from the at least one interaction channel and reduce latency in the multi-channel adapter receiving data as compared to a latency without adjusting the at least one parameter;
subsequent to adjusting the at least one parameter:
receiving, by the multi-channel adapter, the second data that satisfies the adjusted at least one parameter;
detecting, by the multi-channel adapter, a plurality of unique identifiers in the second data, each unique identifier of the plurality of unique identifiers associated with an entity;
generating, by the multi-channel adapter, a subset of the second data for each unique identifier of the plurality of unique identifiers; and
causing, by the multi-channel adapter, a display of the subset of the second data for each unique identifier at a user interface of the client device, the subset of the second data for each unique identifier being sent to the client device as a separate file.

10. The computer-implemented method of claim 9, further comprising:
executing, by the multi-channel adapter, at least one application programming interface call to the at least one interaction channel to cause retrieval of the data by the multi-channel adapter.

11. The computer-implemented method of claim 10, wherein a first application programming interface call of the at least one application programming interface call associated with a first interaction channel of the at least one interaction channel is different than a second application programming interface call of the at least one application programming interface call associated with a second interaction channel of the at least one interaction channel.

12. The computer-implemented method of claim 10, further comprising, prior to adjusting the at least one parameter:
receiving, by the multi-channel adapter, an adjustment to the at least one parameter.

13. The computer-implemented method of claim 9, wherein the plurality of unique identifiers comprises a first unique identifier associated with a first entity and a second unique identifier associated with a second entity, and wherein the method further comprises:
executing, by the multi-channel adapter, a plurality of application programming interface calls to a set of interaction channels based on the adjusted at least one parameter;
receiving, by the multi-channel adapter, third data from the set of interaction channels, the third data associated with the first entity and the second entity;
detecting, by the multi-channel adapter, the first unique identifier for the first entity and the second unique identifier for the second entity in the third data;
generating, by the multi-channel adapter, a first file with a first subset of the third data associated with the first unique identifier and a second file with a second subset of the third data associated with the second unique identifier; and
transmitting, by the multi-channel adapter, the first file and the second file with an indication of the first file and the second file being received together.

14. The computer-implemented method of claim 9, wherein the at least one parameter comprises a parameter that is unique to each interaction channel of the at least one interaction channel and based on at least one type of data in each interaction channel of the at least one interaction channel.

15. The computer-implemented method of claim 14, wherein the at least one parameter is adjustable via the client device.

16. A non-transitory computer-readable medium comprising instructions that are executable by a processing device for causing the processing device to perform operations comprising:
- storing, by a multi-channel adapter, at least one parameter defining data requested by a client device;
- receiving, by the multi-channel adapter, the data that satisfies the at least one parameter from at least one interaction channel in response to a request for the data;
- receiving, by the multi-channel adapter, a processing time that is a length of time for the multi-channel adapter to receive the data from the at least one interaction channel;
- determining, by the multi-channel adapter, that the processing time exceeds a processing time threshold;
- in response to determining that the processing time exceeds the processing time threshold, adjusting, by the multi-channel adapter, the at least one parameter to reduce a subsequent processing time for the multi-channel adapter to receive second data from the at least one interaction channel and reduce latency in the multi-channel adapter receiving data as compared to a latency without adjusting the at least one parameter;
- subsequent to adjusting the at least one parameter:
  - receiving, by the multi-channel adapter, the second data that satisfies the adjusted at least one parameter;
  - detecting, by the multi-channel adapter, a plurality of unique identifiers in the data, each unique identifier of the plurality of unique identifiers associated with an entity;
  - generating, by the multi-channel adapter, a subset of data for each unique identifier of the plurality of unique identifiers; and
  - causing, by the multi-channel adapter, a display of the subset of data for each unique identifier at a user interface of the client device, the subset of data for each unique identifier being sent to the client device as a separate file.

17. The non-transitory computer-readable medium of claim 16, further comprising instructions executable by the processing device for causing the processing device to:
- execute, by the multi-channel adapter, at least one application programming interface call to the at least one interaction channel to cause retrieval of the data by the multi-channel adapter.

18. The non-transitory computer-readable medium of claim 17, wherein a first application programming interface call of the at least one application programming interface call associated with a first interaction channel of the at least one interaction channel is different than a second application programming interface call of the at least one application programming interface call associated with a second interaction channel of the at least one interaction channel.

19. The non-transitory computer-readable medium of claim 17, further comprising instructions executable by the processing device for causing the processing device to, prior to adjusting the at least one parameter:
- receive, by the multi-channel adapter, an adjustment to the at least one parameter.

20. The non-transitory computer-readable medium of claim 16, wherein the plurality of unique identifiers comprises a first unique identifier associated with a first entity and a second unique identifier associated with a second entity, and further comprising instructions executable by the processing device for causing the processing device to:
- execute, by the multi-channel adapter, a plurality of application programming interface calls to a set of interaction channels based on the adjusted at least one parameter;
- receive, by the multi-channel adapter, third data from the set of interaction channels, the third data associated with the first entity and the second entity;
- detect, by the multi-channel adapter, the first unique identifier for the first entity and the second unique identifier for the second entity in the third data;
- generate, by the multi-channel adapter, a first file with a first subset of the third data associated with the first unique identifier and a second file with a second subset of the third data associated with the second unique identifier; and
- transmit, by the multi-channel adapter, the first file and the second file with an indication of the first file and the second file being received together.

* * * * *